Dec. 22, 1942.    R. RICHARDS    2,305,994
ADJUSTABLE CLAMPING DEVICE FOR NOZZLES OR THE LIKE
Filed Jan. 31, 1941    2 Sheets-Sheet 1
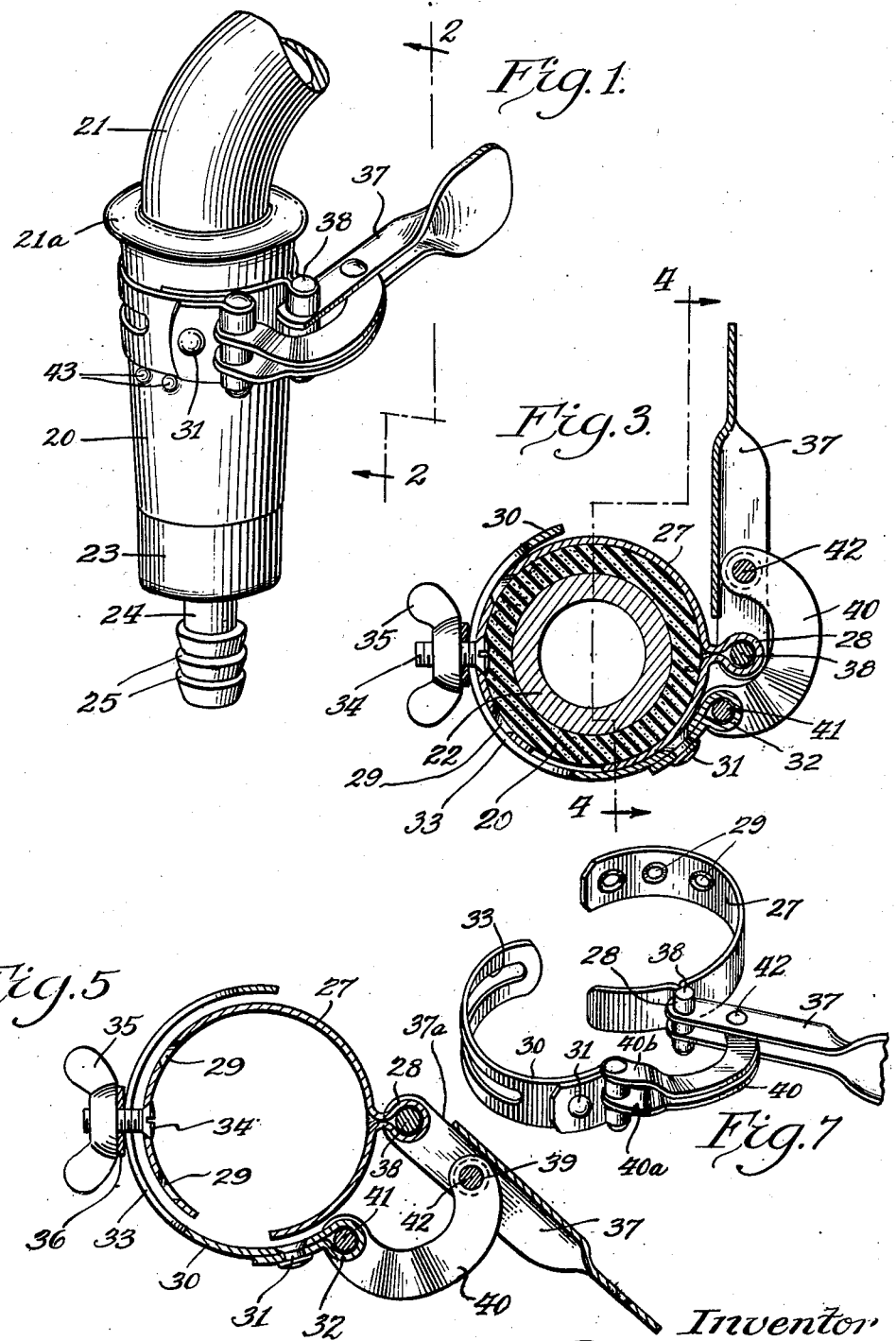
Inventor
Ross Richards
By John F. Brezina
Attorney Dec. 22, 1942.  R. RICHARDS  2,305,994
ADJUSTABLE CLAMPING DEVICE FOR NOZZLES OR THE LIKE
Filed Jan. 31, 1941  2 Sheets-Sheet 2
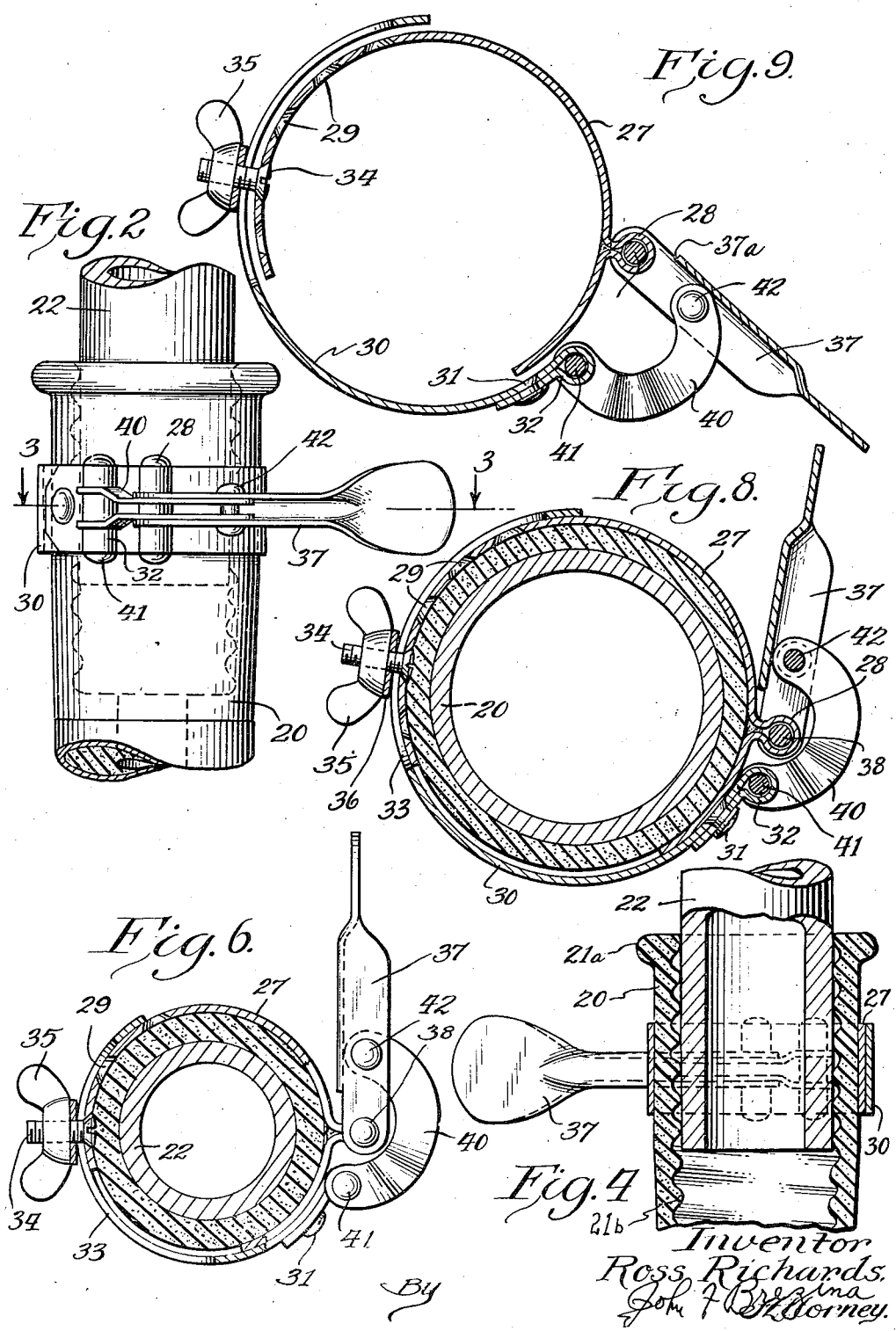

Patented Dec. 22, 1942

2,305,994

UNITED STATES PATENT OFFICE 2,305,994

ADJUSTABLE CLAMPING DEVICE FOR NOZZLES OR THE LIKE

Ross Richards, Chicago, Ill.

Application January 31, 1941, Serial No. 376,822

6 Claims. (Cl. 24—19)

My invention is directed to nozzle clamping, mounting and securing devices and means adapted for releasably mounting nozzles, tubes and other yieldable or flexible passaged units or members on faucets, fitting and valve nozzles and similar devices used controlling the flow of fluid.

Conventional faucets and nozzles thereof, particularly water faucets for lavatories, bathtubs, kitchen sinks and the like of various and numerous manufacturers are of varying shades and designs and have water outlets or nozzles of varying sizes and shapes, some being round, others hexagon or octagon and some provided with outwardly protruding annular flanges adjacent the mouths thereof. Presently existing connection fittings usually known as inlet and connection nozzles of forming parts of flexible tube-connected bath sprays or spray nozzles used at kitchen sinks are formed of a tubular centrally passaged member usually of rubber or rubber compositions which are intended to be slipped upon the faucet outlet or nozzle to be held by friction and the normal contraction tendency of the rubber material of which the unit is formed. These presently known slightly stretchable and usable connection nozzles have been found in a large measure unsatisfactory for many types of faucets and particularly have been found short-lived due to the fact that the rubber composition of which the connection fitting is formed soon lose their elasticity and contraction tendency and result in the connection fitting either dropping off by gravity or being forced off by water pressure. I have found that the greater portion of presently known water-shower connection units of the above type do not, after relatively short duration of use, do not remain upon the many varying shapes and designs of stationary metal nozzles comprising parts of the plumbing fixtures for the reasons above stated, and it is therefore an important object of my invention to provide conveniently releasable fastening and securing devices for satisfactorily mounting the nozzle of a spray unit to a variety of faucet nozzles.

A further important object of my invention is the provision of a manually actuated releasable clamping member of substantial annular form adapted to be itself mounted upon the passaged yieldable body of a tube-connection fitting, and which device includes a pivotably mounted arm, a suitable band and link means connecting one separable free end of the band with said arm whereby the free ends of the band may be drawn together to contract and clamp the flexible fitting connection upon faucet nozzles.

In a further object of my invention is the provision of a releasable clamping device including manually actuable toggle-like lever means so connected as to selectively separate or draw together the ends of a metal annular strap surrounding a flexible passaged connection fitting, and which also includes a manually adjustable means for connecting together two arcuate band or strap portions of the clamping unit whereby the same may be initially fitted to tubular yieldable connection units of varying sizes.

A further object of my invention is the provision of toggle-like releasable and adjustable clamping units for passaged tubular bodies such as separate connection fittings, and which comprise two arcuate straps which have their normally adjacent ends connected together by a releasable bolt or the like, and in which the offset adjacent ends are connected by a pivoted lever and a link of one of said strap ends to said lever whereby the circular unit may be drawn together or separated at will to thereby clamp the yieldable passaged body about a stationary faucet or the like.

A further object of my invention is the provision of a manually operable clamping member to contractible yieldable connection units which include a substantially circular flexible strap or band having its ends over-lapping and the outer of said free ends being provided with a plurality of spaces by apertures or slots, and including pivoted toggle-like lever link and hook means whereby the hook thereof may be releasably anchored in any one of said plurality of apertures or slots in order to adjust the size of said clamping device to various sizes of passaged flow-controlled fittings.

A further object of my invention is the provision of manually operable annular clamping devices adapted to be mounted about yieldable and contractible passaged connection units for faucets and the like, and which have their separable ends normally over-lapping and having such ends provided with pivotably connected connecting links and a pivoted arm, one of said connecting links having serrated teeth and adapted to frictionally engage and unhinge the service of one of said ends to releasably hold said over-lapping ends of said clamping device in desired positions.

Other and further important objects of my invention will be apparent from the following description, accompanying drawings, and appended claims.

This information, in the preferred forms, is illustratively described in the following with reference to the accompanying drawings showing the illustrated forms thereof.

Fig. 1 is a perspective view of one preferred form of my adjustable clamping device mounted on a yieldable tubular connection nozzle.

Fig. 2 is a side elevational view of said clamping device.

Fig. 3 is a cross section view taken on line 3—3 of Fig. 2.

Fig. 4 is a cross sectional view taken on a vertical plane of line 4—4 of Fig. 3.

Fig. 5 is a top plan view of the clamping device itself with portions of the arcuate strap members shown in cross section.

Fig. 6 is a horizontal cross section view of one form of my invention shown as mounted upon a tubular rubber connection unit.

Fig. 7 is a perspective view of one form of my invention showing same dismounted and in open separated position and with the releasable bolt removed.

Fig. 8 is an enlarged horizontal cross sectional view of one form of my invention illustrated in mounted position upon a tubular yieldable connection nozzle.

Fig. 9 is an enlarged partially cross sectional view of the adjustable clamping unit shown with the normally secured-together ends separated and with the clamping lever and link in substantially open position.

Referring to the drawings, reference numeral 20 designates a substantially cylindrical tubular body formed of sufficiently elastic rubber composition to provide ample contraction and expansion thereof to permit its being repeatedly slipped on and off the spout or mouth of a faucet, or the nozzle or the protruding end of the water feed fitting or pipe 22 such as illustrated in Figs. 2 and 4. In Fig. 1 I have illustrated only a fragment of a typical spout 21 of a conventional water faucet, the ends of various presently known faucets being provided with integral flanges and enlargements of varying shapes such as octagon as well as circular.

The rubber coupling member 20 is preferably provided with an upper thicker portion formed by the integral annular flange 21a which reinforces the unit against being torn from the edge in mounting thereof, and said rubber coupling is also preferably provided with a plurality of spaced apart corrugations 21b which preferably extend in substantially horizontal directions or may be formed as a continuous internal spiral substantially as illustrated in Fig. 4. A metal fitting 23 which has a central passage therethrough has one reduced end suitably secured in the lower end of the tubular rubber body of the connection coupling 20 and has formed integral therewith at its lower end a substantially reduced tubular nipple or nozzle 24 which is provided with a plurality of annular flanges 25 as illustrated in Fig. 1. One end of a conventional rubber hose such as used in spraying devices is mountable upon the flanged nipple 24 so as to securely mount said hose thereto. A fragment of said hose designated by numeral 26 is illustrated in certain views hereof.

Referring to Figs. 2, 3, 4 and 5, reference numeral 27 designates a substantially circumferential clamping band or strap which does not form a complete circle but normally defines segments such as illustrated in the drawings. This clamping band or strap 27 is made of suitable spring steel or other suitable flexible metal and has formed as an integral part thereof a pivot-receiving ear or eyelet 28 at a point spaced from one free end thereof as illustrated. The opposite end of the circular clamping strap 27 is provided with a plurality of spaced apart apertures 29 which are adapted to receive a releasable bolt herein described. In the first preferred form of the drawings three of said apertures are shown.

Referring again to Figs. 3 to 5, numeral 30 designates an arcuate metal clamping strap or band which is preferably slightly more than a semi-circle and which has one end thereof doubled back and bent outwardly and thence secured to the main body of the scrap by suitable means, as for example by a suitable rivet 31. This provides a pivot-receiving knuckle 32 as illustrated. The clamping strap 30 is formed with a longitudinally extending centrally disposed slot 33 as clearly shown in the drawings, this slot preferably extending over a major portion of the length of said strap 30.

The two arcuate clamping straps just described are normally releasably held connected together by a bolt 34 having a suitable wing type or other threaded nut 35 thereon with an optional washer 36 interposed between said clamping strap and said nut. Said bolt 34 may be mounted in any one of the apertures 29 of strap 27 and because thereof and of the length of the slot 33 the size of the clamping unit and consequently the relative positions of the two clamping straps may be varied through a wide range to fit spouts, nozzles and other liquid outlet fixtures of varying sizes and shapes.

A lever arm 37 which may be relatively short and of suitable metal and which is preferably provided with an aperture through one end and with an enlarged grippable portion at the other normally free end is preferably mounted for movement by means of suitable rivet 38 which passes through and is secured in the eyelet 28 of the clamping strap 27. This manually operable arm, lever or handle 37 is illustrated as being stamped from a single metal blank and bent along a longitudinal line as illustrated in Figs. 1, 2, 4 and 7, the normally pivoted end thereof being provided with a suitable recess 37a which bifurcates the pivoted end of said lever or arm 37 so that said lever end would not impinge or engage the outer flat surface of clamping strap 27 until it has been moved a sufficient distance into clamped securing position.

The lever or arm 37 is provided intermediate its end, and preferably nearer to its pivoted end than to its grippable end with suitable registering apertures indicated by numeral 39 adapted to receive a pivot element of the connecting link. The lever 37 is connected to the knuckle 32 of clamping strap or member 30 by means of an arcuate metal strap or connecting link 40 which is illustrated in the drawings as in various positions. Said connecting link 40 may be of either single or double construction and stamped from a single metal blank and provided at its ends with suitable apertures so that the same may be pivotally mounted to pivotally connect lever 37 and clamping strap 30. This mounting is accomplished by a suitable rivet 41 which passes through one or more of the knuckles 32 and through one end aperture of connecting link 40, by a rivet 42 which passes through one end portion of the apertures 39 of lever 37 and through the other end aperture of the connecting link 40. While the connecting link 40 is illustrated in the first form as of doubled back construction wherein one end of the connecting link 40 is riveted between the turned back lateral edges thereof, I desire it to be understood that said arcuate link 40 may comprise an anchoring flat metal blank which would satisfactorily operate in the herein described manner. As clearly shown in Fig. 7, and in this particular preferred form, one end of the doubled connecting link 40 is bifurcated forming two ends 40a and 40b which are pivoted in the spaced apart positions to knuckle 39 by rivet 41.

In Fig. 7 the two arcuate clamping members or clamping straps 27 and 30 are shown disassembled, namely with the normally connecting bolt 34 removed and the clamping member separate from each other, while in Figs. 3, 5 and 9 the same are shown connected together, Fig. 5 showing the clamping members slightly separated from each other for illustration and showing the lever 37 released or in open position. The clamping device is mounted upon the yieldable and contractable tubular body of the rubber cup-like coupling 20 and preferably placed in a position near the upper end of said coupling. Suitable fastening elements, i. e. studs, lugs, staples, flanges or the like, two of which studs or lugs are illustrated in the left of Fig. 1, indicated by numeral 43, may be provided on or mounted in the body of the coupling at suitable points to prevent gravity slippage of the clamping device from the coupling unit.

The closed holding position of my clamping device is illustrated in Figs. 1 to 4 inclusive and 6 and 8 respectively, and it will be noted that the curvature or the arcuate angle of the connecting link 40 is sufficiently great so that when lever 37 is moved into the substantially or wholly clamped position, the central point of the pivot 38 will be outside of a straight line connecting the central points of the rivets 41 and 42. The natural tendency of the yieldable material of the coupling member 20 to expand and assume its normal shape will exert a separating stress or expansion tendency to the arcuate strap members 27 and 30 which when the clamping device is closed or locked as illustrated will not only cause the lever 37 to snap into closed position but will also hold the said lever in closed clamp-securing position such as illustrated in Figs. 2, 3, 6 and 8.

In those instances where the yieldable and contractable coupling member 20 is mounted upon spouts or nozzles of non-round shapes, for example hexagon or octagon, the clamping action of the device will contract the portions of the rubber coupling unit 20 securely against the irregular non-round surfaces of the spout due to the yielding tendency, flexibility and texture of the metal with which said coupling unit 20 is formed, this resulting in securely sealing all spaces between the irregular non-round exterior surfaces of the spout or nozzle and said coupling unit.

Fig. 9 is an enlarged view similar to Fig. 5 showing the clamping straps 27 and 30 separated for clarity and showing the lever and arcuate connecting link in partially open position. Fig. 5 is a view of the same construction mounted on the contractable flexible body of the coupling 20 with the clamping device in drawn together securing position and with the lever in extreme closed position. It will be apparent that a single clamping device of my aforedescribed construction may, due to the spring-like texture and flexibility of the clamping straps 27 and 30, be changed in size to fit various requirements and fluid spouts and nozzles of various sizes.

I am aware that various changes may be made in the embodiment of the invention herein specifically described without departing from or sacrificing any of the advantages of the invention or any features thereof, and nothing herein shall be construed as limitations upon the invention, in concept or structural embodiment as to the whole or any part thereof except as defined in the appended claims.

I claim:

1. In a device for releasably clamping yieldable tubular centrally passaged body of yieldable contractable material to a faucet spout; a pair of circumferential clamping members having their adjacent ends normally overlapping each other; a releasable bolt normally securing one end of each said members in adjacent overlapped position; knuckles on the other end of one of said members; knuckles on the other clamping member and intermediate its ends; a lever pivoted at one end to said last mentioned knuckles; an arcuate connecting link connecting said first mentioned knuckles and an intermediate portion of said lever whereby pivoting of said lever into closing position is adapted to tighten said clamping device on a tubular body to contract the latter into mounted position.

2. In an adjustable clamping device for mounting tubular bodies to nozzles or the like, a pair of arcuate metal straps, each thereof greater than a semi-circle when in normal position; one arcuate end of each of said straps being overlapped and adjustably and releasably secured together, one of said overlapping ends having a plurality of spaced apart apertures therein and the other of said overlapping ends having an aperture therethrough; a releasable bolt for securing said overlapped ends together; a knuckle on each of the other two ends of said straps and normally spaced apart; a lever pivoted on one of said knuckles; an arcuate connecting link pivoted on one end of the other of said knuckles and pivoted at its other end on an intermediate portion of said lever, whereby pivoting movements of said lever alternately separates said last mentioned strap ends and draws the same together, the drawing-together movement thereof being adapted to contract a portion of a yieldable tubular body on which said clamping device is mounted.

3. In a passaged device for releasably mounting yieldable passaged connection members to spouts or the like, a pair of arcuate clamping straps having both ends of each thereof normally in overlapped position, one of said pair of overlapped ends being releasably and adjustably connected together, the other pair of overlapped ends being movable and separable through flexing of said straps; a lever arm pivoted to one of said straps at a point spaced from the free end thereof; an arcuate connecting link pivoted at one end to the movable end of the other of said straps and pivoted to an intermediate portion of said lever arm, the pivoting movement of said arm in one direction being adapted to flex said straps to enlarge the area encompassed thereby and lever movement in the other direction being adapted to draw said straps together and being adapted to contract a yieldable passaged body to mount the same on a passaged connection member.

4. In a passaged device for releasably mounting yieldable passaged connection members to spouts or the like, a pair of arcuate clamping straps having both ends of each thereof normally in overlapped position, one of said pair of overlapped ends being releasably and adjustably connected together, the other pair of overlapped ends being movable and separable through flexing of said straps; a lever arm pivoted to one of said straps at a point spaced from the free end thereof; an arcuate connecting link pivoted at one end to the movable end of the other of said straps and pivoted to an intermediate portion of said lever arm, the pivoting movement of said arm in one direction being adapted to flex said straps to enlarge the area encompassed thereby and lever movement in the other direction being adapted to draw said straps together and being adapted to contract a yieldable passaged body to mount the same on a passaged connection member; the axis of the pivots of said connecting link being inward of the axis of the pivoting means of said lever arm whereby said clamping device will be held in locked position by the normal expansion tendency of the yieldable passaged member on which said clamping device is mounted.

5. In a passaged device for releasably mounting yieldable passaged connection members to spouts or the like, a pair of arcuate clamping straps having both ends of each thereof normally in overlapped position, one of said pair of overlapped ends being releasably and adjustably connected together, the other pair of overlapped ends being movable and separable through flexing of said straps; a lever arm pivoted to one of said straps at a point spaced from the free end thereof; an arcuate connecting link formed of a metal blank doubled back upon itself along a longitudinal line and having its opposite ends apertured and projecting outwardly, said apertured link ends being pivoted to the movable end of one of said straps and also pivoted to an intermediate portion of said lever arm, the pivoting movement of said arm in one direction being adapted to flex said straps to enlarge the area encompassed thereby and lever movement in the other direction being adapted to draw said straps together and being adapted to contract a yieldable passaged body to mount the same on a passaged connection member.

6. In a clamping device adapted for mounting yieldable passaged connection members to flow nozzles or the like; a pair of arcuate metal straps having their respective ends overlapped and adapted to define a substantial circle in one position; a releasable and adjustable fastening element for securing together one pair of the overlapped strap ends; a knuckle element on the other end of each of said strap members, said knuckle elements being substantially spaced apart; a lever arm pivoted at one end to one of said knuckle elements; a non-straight connecting link pivotally connecting the other of said knuckle elements and an intermediate portion of said lever arm whereby pivoting movement of said lever arm will alternately contract and expand said straps, said connecting link being so pivoted and shaped so as to cause the normal expansive action of the tubular body on which said clamping device is mounted to hold said lever and said straps in locked securing positions.

ROSS RICHARDS.